US011120293B1

(12) United States Patent
Rosenzweig et al.

(10) Patent No.: US 11,120,293 B1
(45) Date of Patent: Sep. 14, 2021

(54) AUTOMATED INDEXING OF MEDIA CONTENT

(71) Applicant: Amazon Technologies, Inc., Reno, NV (US)

(72) Inventors: Jesse Jerome Rosenzweig, Portland, OR (US); Brian Lewis, Portland, OR (US); Leah Siddall, Portland, OR (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 316 days.

(21) Appl. No.: 15/823,249

(22) Filed: Nov. 27, 2017

(51) Int. Cl.
| | |
|---|---|
| G06K 9/62 | (2006.01) |
| H04N 19/87 | (2014.01) |
| G06T 7/246 | (2017.01) |
| H04N 19/142 | (2014.01) |
| G06T 7/215 | (2017.01) |
| G06F 16/16 | (2019.01) |
| G06F 16/783 | (2019.01) |
| G06F 16/9535 | (2019.01) |

(52) U.S. Cl.
CPC ......... *G06K 9/6202* (2013.01); *G06F 16/164* (2019.01); *G06F 16/7837* (2019.01); *G06F 16/9535* (2019.01); *G06T 7/215* (2017.01); *G06T 7/246* (2017.01); *H04N 19/142* (2014.11); *H04N 19/87* (2014.11)

(58) Field of Classification Search
CPC .... G06F 16/639; G06F 16/335; G06F 16/435; G06F 3/0484; G06F 16/9535
See application file for complete search history.

(56) References Cited

U.S. PATENT DOCUMENTS

| | | | | |
|---|---|---|---|---|
| 6,233,356 B1 * | 5/2001 | Haskell | ................ | H04N 5/4401 348/408.1 |
| 6,483,875 B1 * | 11/2002 | Hasebe | .................. | H04N 5/268 348/700 |
| 6,553,150 B1 * | 4/2003 | Wee | ...................... | H04N 19/132 348/473 |
| 6,594,311 B1 * | 7/2003 | Pearlstein | ........ | H04N 21/23892 375/240.01 |
| 6,873,723 B1 * | 3/2005 | Aucsmith | ................ | G06K 9/38 345/419 |
| 6,973,130 B1 * | 12/2005 | Wee | .......................... | G06T 9/20 375/240.08 |
| 7,106,886 B2 * | 9/2006 | Shimakage | ........ | G06K 9/00798 382/104 |

(Continued)

*Primary Examiner* — Yosef Kassa
(74) *Attorney, Agent, or Firm* — Hogan Lovells US LLP

(57) ABSTRACT

Various types of objects or occurrences can be automatically detected in input media being processed using a transcoder. The media content can be analyzed to determine various transitions, such as scene changes, which provide insight into useful locations for performing object recognition. Representative frames subsequent a transition are analyzed to determine whether they are appropriate for image analysis, using factors such as amount of motion, brightness, color, or pixel disparity within the frame. If a representative frame meets the various criteria, that frame is sent to an object recognition service for analysis. The output of the service can be a set of object tags that provide information identifying the object and its location in the media. The output tags can be encoded into the output video or stored to an associated metadata file, among other such options.

20 Claims, 9 Drawing Sheets

(56) References Cited

U.S. PATENT DOCUMENTS

| | | | | |
|---|---|---|---|---|
| 7,164,784 | B2 * | 1/2007 | Beardsley | G06K 9/32 |
| | | | | 382/106 |
| 7,281,034 | B1 * | 10/2007 | Eyal | H04N 21/26258 |
| | | | | 709/206 |
| 7,409,639 | B2 * | 8/2008 | Dempski | G06Q 10/10 |
| | | | | 715/705 |
| 7,720,871 | B2 * | 5/2010 | Rogers | G06F 21/10 |
| | | | | 707/802 |
| 7,738,550 | B2 * | 6/2010 | Kuhn | H04N 21/23433 |
| | | | | 375/240.01 |
| 8,045,584 | B2 * | 10/2011 | Apostolopoulos | H04L 29/06027 |
| | | | | 370/473 |
| 8,045,785 | B2 * | 10/2011 | Kitamura | G06K 9/00 |
| | | | | 348/125 |
| 8,392,206 | B2 * | 3/2013 | Parekh | G06Q 10/107 |
| | | | | 705/1.1 |
| 8,687,896 | B2 * | 4/2014 | Yoshimi | G06K 9/00798 |
| | | | | 382/199 |
| 8,732,195 | B2 * | 5/2014 | Skeen | G06F 16/639 |
| | | | | 707/769 |

* cited by examiner

AUTOMATED INDEXING OF MEDIA CONTENT

BACKGROUND

Users are increasingly obtaining content in digital format, often downloading or streaming that content from a remote service. The content will often be provided in a first format, such as a high resolution content, that will then be converted into various other formats appropriate for different devices or content streams. It may be the case that a provider or consumer would like to have information regarding the media content, such as information about the types and locations of objects represented in the video content. Analyzing all the frames of a high resolution media file can be extremely time and resource intensive, such that various conventional approaches attempt a periodic sampling of the frames. A random or unintelligent sampling of frames can miss occurrences between the samples, however, and may also pick up frames that do not include accurate representations of objects, such that the recognition of objects in the content may not be sufficiently accurate.

BRIEF DESCRIPTION OF THE DRAWINGS

Various embodiments in accordance with the present disclosure will be described with reference to the drawings, in which.

DETAILED DESCRIPTION

Figure 1A:
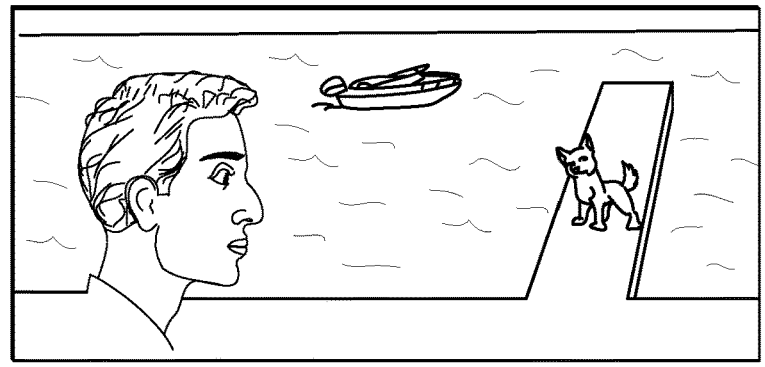
FIGS. 1A, 1B, and 1C illustrate an example image frames that can be extracted from a media file in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the processing of media content. In particular, various embodiments allow for the automated recognition of objects or occurrences in a media file. An input media file can be processed using a transcoder service, for example, which can generate one or more differently encoded video output files. During the transcode process, the content can be analyzed to determine various types of transitions, such as may include, or relate to, scene changes, scene boundaries, fades, cuts, wipes, shot changes, and the like, which can provide insight into useful locations for performing object recognition. The analysis can use information such as audio, video, image, caption, metadata, or other data contained within, or associated with, the media file. Representative frames proximate a transition can be analyzed to determine whether they are appropriate for image analysis. This can include analyzing information such as an amount of motion, brightness, color, or pixel disparity within the frame, among other such options. If a representative frame for a scene or shot meets the various criteria, that frame can be sent to an object recognition service for analysis. The output of the service can be a set of object tags, for example, which can provide information such as identifying information for the object, timestamp or location information, and a confidence or probability value, among other such options. The output tags can be encoded into the output video file(s) or stored to an associated metadata file, among other such options. Such an approach provides for object recognition through the transcode process using only a single pass through the media content. Once identified, the object data can be used to locate media content containing a certain object or type of object, or can be used to determine additional content to provide or recommend to a viewer, among other such options.

Various other such functions can be used as well within the scope of the various embodiments as would be apparent to one of ordinary skill in the art in light of the teachings and suggestions contained herein.

As mentioned, it can often be desirable to various parties to be able to determine information about objects and occurrences represented in a video file. For example, a content provider might have hundreds of thousands or millions of media files, and would like to be able to determine information about the contents of those files. This may not be limited to title or topic, for example, but may include determinations of files that contain a specific actor, landmark, song, location, etc. Oftentimes the metadata provided or received with a given file will not provide such information. Various approaches, such as may relate to computer vision or object recognition, can be used to analyze image or video content and attempt to identify or recognize various objects represented in the image or video data. As mentioned, however, performing such recognition on a high resolution, high bit rate video frame can be very time and resource intensive. This is exacerbated when one considers that a video file might playback at sixty frames per second, for example, and a movie file might be over two hours long. Further, such an approach will repeatedly provide the same or similar results for each sampled frame in a scene, thus incurring significant additional overhead with no significant benefit. Accordingly, various conventional approaches attempt to sample the video frames in order to reduce the number of frames to be analyzed. This can result in various objects not being detected unless they appear in one of the sampled frames. Further, conventional systems can encode the video before analysis, such that the resolution of the video to be analyzed is lower, requiring less resource capacity. Such an approach requires a second pass through the content, however, and may be less accurate since operating on lower resolution and/or compressed video data.

Accordingly, approaches in accordance with various embodiments attempt to identify representative frames during the encoding process that can be processed with an object recognition algorithm or other such process. Such an approach enables the video to be processed in a single pass, which can conserve time and resources, and can also potentially work on live streaming data. The process can analyze the media data to attempt to determine information in the data that would make a given frame of data unreliable for purposes of object recognition. It should be understood that a "frame" of video data refers to a segment or portion of a media file at a point in time, or over a relatively short period of time as may be concurrently displayed on a display device, and does not require a specific type of frame, as in a frame of film, or file of data unless otherwise specifically stated. The encoder can analyze various aspects of the file during the encoding process that can be used to select appropriated frames (or prevent inappropriate frames from being selected for analysis). This can include information found in the video data, audio data, closed captioning data, metadata, and the like.

Figure 1B:
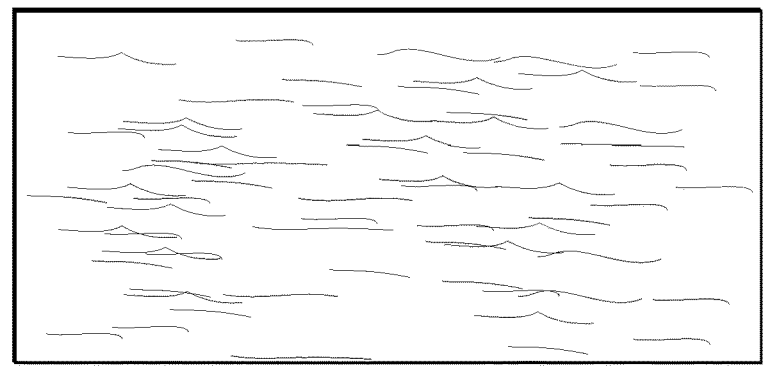
Figure 1C:
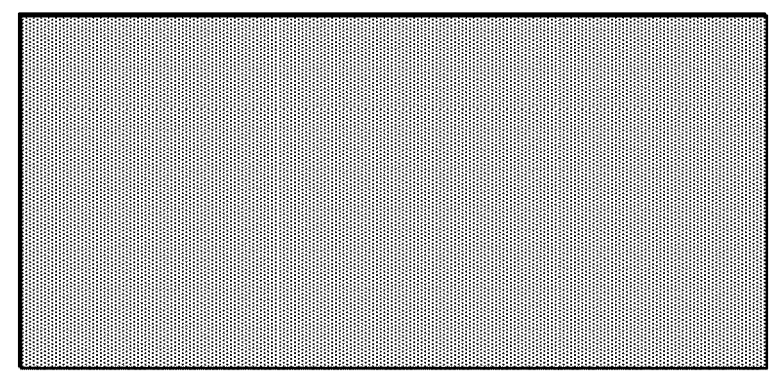

For example, FIGS. 1A through 1C illustrate example frames of video data for a media file that can be analyzed in accordance with various embodiments. In FIG. 1A, a frame 100 of video content is illustrated that include relatively little motion due to camera movement, zoom, action, or object movement. As such, an object recognition algorithm would have a high likelihood of being able to identify several objects represented in the image data, as may relate to a boat, an animal or dog, and a human/man/adult or specific actor, among other such options. Such an algorithm may also be able to determine certain aspects of those objects, such as the emotional state of an actor, an expression made by an actor, a sentiment represented by a person or persons, the body language of an actor, an action performed by a human or an animal, and the like. It may be beneficial to have any of this information obtained and stored with the media file, or associated with the media file, in order to be able to index the video content. Using such an approach, it could be determined that this video file, and in particular this particular scene of the video file, includes a specific actor, dog, and boat. A user searching for content involving a certain actor could then locate this media file, and if desired could be directed straight to this particular scene. Similar search approaches could be used for scenes with a specific type of dog or boat. Similarly, advertisers or content providers might use this information to determine additional content for a viewer, such as advertising to display or additional content to recommend, such as an advertisement for a boat or a movie starring that actor. The object identification information can include time stamp or other information that can quickly enable the relevant sections of the media file to be located that include a representation of the identified object(s).

It will often be the case, however, that some frames of content will not be useful for accurate object detection or identification. For example, the video frame 120 illustrated in FIG. 1B might correspond to a frame during the panning of a camera quickly across a scene. As illustrated, the particular frame would demonstrate significant motion blur, or motion effects, such that no object may reliably be detectable from the frame. Accordingly, it can be desirable to exclude such frames from the recognition process in order to conserve time and resources. Similarly, the video frame 140 illustrated in FIG. 1C might be a black frame, or solid color frame, that might happen during a scene change, shot transition, or other such action. There might be many of these frames in a television or movie file, for example, and the inability to recognize any objects from the frame can make it desirable to exclude such frames from recognition. Various other factors or aspects of video or image frames can make them desirable to exclude from object recognition as well as discussed and suggested elsewhere herein.

One approach that can be used to attempt to locate representative frames relates to automated scene detection. A video compression and/or encoding system can detect scene transitions and boundaries using various approaches. For example, a difference (or DIFF) between corresponding pixel values of adjacent frames can be analyzed to attempt to determine a shot change or scene change, where a significant change in the image data is detected. For a scene change, for example, it might be desirable to exclude the frames corresponding to the change, or proximate the change, but to potentially select frames after the change once the average difference (or other measure) of the pixel values settles back to within a determined threshold or criteria, indicating that the scene is relatively stable. Such an approach can be useful in at least some embodiments to ensure that frames during transitions are excluded, but that representative frames are selected for each shot or scene in a media file (at least to the extent a given scene or shot has an acceptable frame for analysis). Various other types of scene detection logic can be used as well, such as may provide support for slow scene transitions by analyzing changes over a period of time of the media file.

Other information can be used to attempt to identify scene or shot changes as well. For example, a flash or significant motion might occur that might be detected as a scene change based on pixel differences alone, but closed captioning data or other captioning information or metadata might help to determine when such an occurrence does not correspond to a scene change. For example, some captioning might include a tag or identifier for a change. Further, the captioning might indicate that an explosion occurs, a person moves across the room, or a camera pans, which can help to determine that the frames may not be useful for object recognition, but also do not indicate a new scene or shot for which a subsequent analysis should be performed. In some embodiments, a speech-to-text or other such analysis can be performed to attempt to determine similar information from the audio data of the media file.

In at least some embodiments the media data can be analyzed to select representative frames, and analyze those frames, during the transcoding process. In some embodiments the individual frames can be analyzed to attempt to identify candidate frames for object recognition and/or to identify frames that should not be analyzed for object recognition. As mentioned, the scene detection in the transcoder can be used to determine frames during the change that would have a low likelihood of successful object recognition (or higher likelihood of false positives), as well as identifying frames proximate a scene change which may be highly valuable for object recognition as a new object may be represented in the media that has not yet been recognized. In some embodiments, frames toward the beginning of a scene might be analyzed more thoroughly or more frequently than frames later in the scene, except where certain actions or motions may be detected during a scene, as may be indicative of a new object moving into view in the scene. The information about the recognized objects can then be embedded in the transcoded files or saved to an associated file, which can enable the recognition to be performed without an additional pass through the content.

In some embodiments, the motion represented in a given frame, or set of frames, can also be determined for purposes of selecting representative or appropriate frames for analysis. For example, FIGS. 2A through 2D illustrate regions of video frames that can be analyze in accordance with various embodiments. Proximate frames can be analyzed to attempt to determine the change in position of objects represented in those frames. The direction and amount of motion of these objects over a set of frames, as may be represented by one or more pixel locations, can be defined as a motion vector. A set of motion vectors for an image or scene can then be analyzed to attempt to determine an appropriateness of the frame for object recognition. In some embodiments, a frame is broken up into segments which are then compared against the sections for subsequent or adjacent frames, among other such options. The various motion vectors can then be aggregated, such as to determine an aggregate length of the motion vectors, which provides an indication of the amount of movement represented in a frame, or sequence of frames. Approaches can also look at the coherence or directionality of the vector field, etc.

Figure 2A:
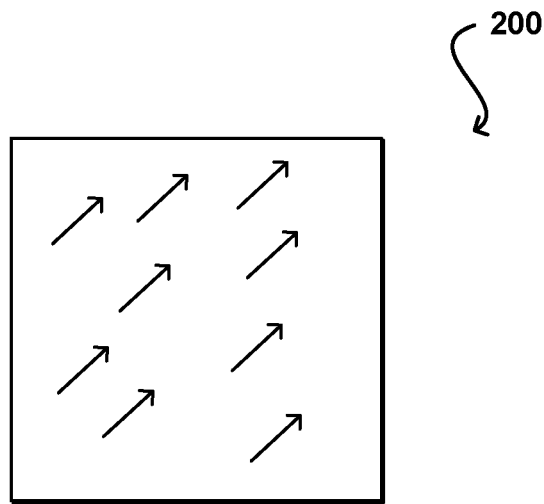
FIGS. 2A, 2B, 2C, and 2D illustrate example motion vector determinations for frames of video content that can be generated in accordance with various embodiments.
Figure 2B:
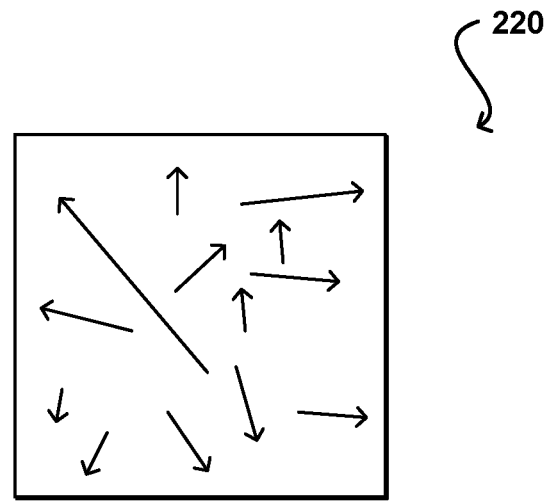

For example, in the analyzed section 200 of a frame of video illustrated in FIG. 2A, the motion vectors determined for the frame are all of substantially the same length and in substantially the same direction. This can be representative of a pan or translation of the camera. Depending at least in part upon the average length of the vectors, or range of lengths, such a pan may not be a good time for object recognition as there may be a decent amount of motion blur or effects represented in the image frame. Such detection can be used, however, to determine that these frames likely do not correspond to a scene transition or shot change, etc. In the example analyzed section 220 of FIG. 2B, on the other hand, the motion vectors are determined to be in a variety of different directions, having a variety of different lengths. This can correspond to an occurrence such as an explosion or other sudden large action that may also make it difficult to recognize objects present in the scene.

Figure 2C:
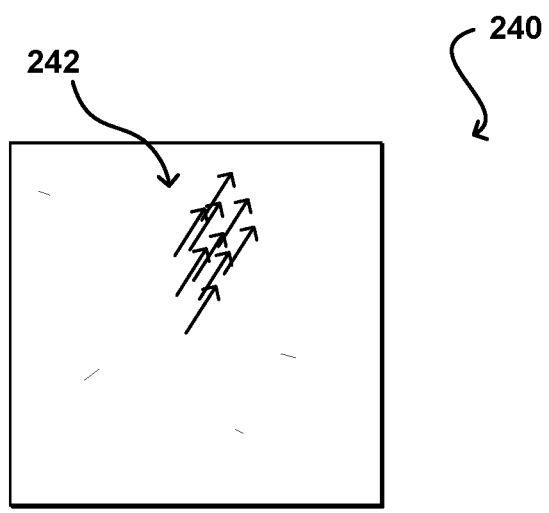

In the example analyzed section 240 of FIG. 2C, there is a significant amount of motion, but the motion vectors are primarily limited to a particular region and moving in the same direction with similar vector lengths. This is indicative of an object moving across the screen, such as may correspond to the boat in FIG. 1A moving across the screen. While such a frame may not be optimal, as the object in motion may be difficult to recognize, the frame itself may still be worth analyzing as the other objects in the scene may be able to be recognized. Further, if the recognition is of a specific action or occurrence instead of the presence of an object, then such detection can help to detect and determine when the action took place, such as when a basketball goes into the basket or baseball is hit by a bat, etc. The selection of the frame in some embodiments may be based at least in part upon the size of the object in motion relative to the frame, as a moving object that occupies less than 10% of the frame may not prevent the frame from being selected, but a moving object that occupies more than 50% of the screen may.

Figure 2D:
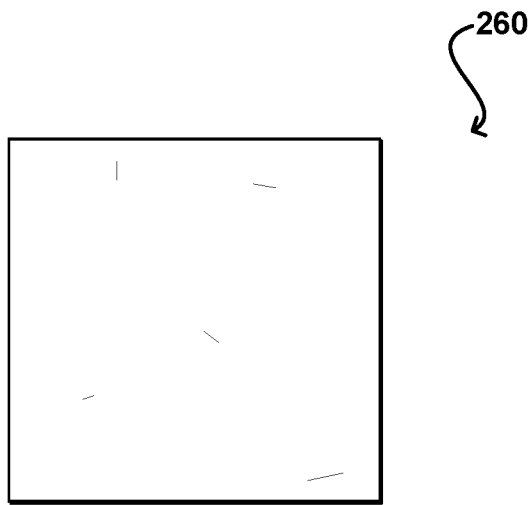

In the example analyzed section 260 of FIG. 2D, there are relatively few motion vectors detected, and the magnitude of the vectors is relatively small, which means that there is little motion in the scene. Thus, if the frame does not correspond to a scene change or similar occurrence, this frame may be appropriate for object recognition. As mentioned with respect to FIG. 1C, however, it is possible that the frame is a dark frame, wherein all the pixels have colors in the range of black, although other similar colors can be processed as well within the scope of the various embodiments. Thus, in at least some embodiments another criterion can be applied to a frame to determine whether to analyze the frame. This can include, for example, a diversity of pixel values. For example, if all of the pixel values are within a tight range of each other, such as during a fade at the beginning or end of a scene, then it is very unlikely that any objects will be able to be recognized from the scene, and the recognition process may also be susceptible for false positives due to the slight variation. Thus, there might be one or more minimum diversity thresholds applied, which may relate to a maximum percentage of pixels that are within a given range of each other. Since there may be objects in the scene with a single color a simple percentage of pixels of similar color may not be sufficient, unless the percentage exceeds an allowable percentage of fraction of the screen. In some embodiments the pixel values can be analyzed for various sections of the frame, or other approaches can be utilized to attempt to determine whether there are regions of sufficiently different color across a given frame. Similarly, if there is a uniform shift across the pixels over a period of time that is consistent with a fade or similar transition, but where the objects may not change or move, then those frames might be excluded from consideration for object recognition as well.

In analyzing the motion vectors for a frame, the approach can depend at least in part upon the type of frame being analyzed. As known for certain types of media content, such as may be encoded in an MPEG format, a sequence of frame can start with a I-frame, and I-frames can be placed periodically throughout the video file. An I-frame can include information for a full frame of video content, for example, that can be used to recover from any glitches in the video file or feed. I-frames can be placed at the beginning of a scene or shot, or other location where the image data changes significantly. The B-frames or P-frames can exist in between I-frames, and can provide information regarding the differences from a previous frame, or differences from adjacent frames. In some embodiments, I-frames can be preferred for selection because the single frame of data can be analyzed without referring to other frames. Some embodiments allow for the selection of B-frames or P-frames as well, but this may require some knowledge and additional processing regarding proximate frames. For motion detection the information about proximate frames may be analyzed anyway, such that selection of an intermediate frame adds little extra processing.

As mentioned, other approaches can be used to assist with frame selection as well. For example, speech-to-text detection can be used to attempt to determine context around a given scene. Sound analysis can be used to attempt to determine specific actions occurring on the screen, such as explosions or rapid motions, which may correspond to less than optimal frames for analysis. Further, any captioning or metadata for a set of frames can be used similarly to attempt to provide context. Since it is often the case where speech or audio will extend over a scene change, black frame, fade, or transition, this information can be used as one indicator to assist with the determination and in most cases not considered to be dispositive. Other factors such as the amount of compression can be used to select frames for analysis as well, as highly compressed frames may be less likely to yield accurate or highly confident object determinations.

Once one or more appropriate frames are selected from within the transcoding process, the image, video, media, metadata, captioning, and/or other data for the frame can be provided to an object recognition algorithm or service, or other such process as discussed herein. The object recognition process can analyze the data, such as by using pattern matching, feature detection, or processing with a trained neural network, to identify types of objects represented in the screen. These can include general types of objects, such as humans or automobiles, or specific objects, such as a specific actor or make and model of vehicle, etc. While some embodiments can process frames individually, the results may not be as accurate as desired. Thus, in some embodiments at least some amount of contextual information is used to assist with the recognition process. For example, the motion or prior determinations of objects in a scene can be used to adjust the confidence in a particular determination. The object recognition process in some embodiments can then return, to the transcoding process or otherwise, information regarding the recognized objects. This information can include, for example, a tag or identifier for each recognized object, a probability match or confidence score, and a timestamp or other location identifier, among other such options. The probability information and tags can be examined over a period of time, along with potentially information about the location in the frame, to determine whether the detected objects correspond to the same object in different frames, which can also help to improve the confidence in the determination. As mentioned, the tag or object information can be embedded into the encoded media file, stored as file metadata, or stored to an appropriate repository and linked to the encoded (or original) media file(s), among other such options. As mentioned, in some embodiments this information can include the probability or certainty information, while in other embodiments only tags with at least a minimum certainty or confidence will be included, and can be included without the confidence values.

In some embodiments, the object data can also be used to adjust aspects of the transcoding. For example, if there are very few objects in a scene or the scene is relatively a single color with little detail, then a lower quality transcode might be used. Similarly, people generally prefer high quality when viewing people and faces, so a higher quality transcode might be used, which utilizes a lower level of compression, a higher bit rate, etc. For situations where parameters may not be adjusted during the transcode, these can be used to feed subsequent transcodes or adjust playback, among other such options.

The number of frames to be analyzed for a single video file or feed can vary among embodiments, as well as with implementation choices. For example, a frame might be selected for analysis after each scene change, shot change, or other significant change in the field of view. Similarly, after any object is detected to newly appear on screen or a significant period of motion, a frame might be selected for analysis. Within a given scene or shot, a sampling might occur as well to improve object detection over time, such as to sample every ten to twelve seconds. With accurate scene detection and motion detection, the need to sample within a given scene may be limited. The amount of sampling may also vary with confidence, as a highly confident determination of objects within a scene may justify fewer to no additional sampling, while a lower confidence determination of one or more objects might trigger more frequent sampling, at least within that scene. The more frequent sampling may continue in at least some embodiments until the confidence of the determinations meets at least a specified value or threshold.

Figure 3:
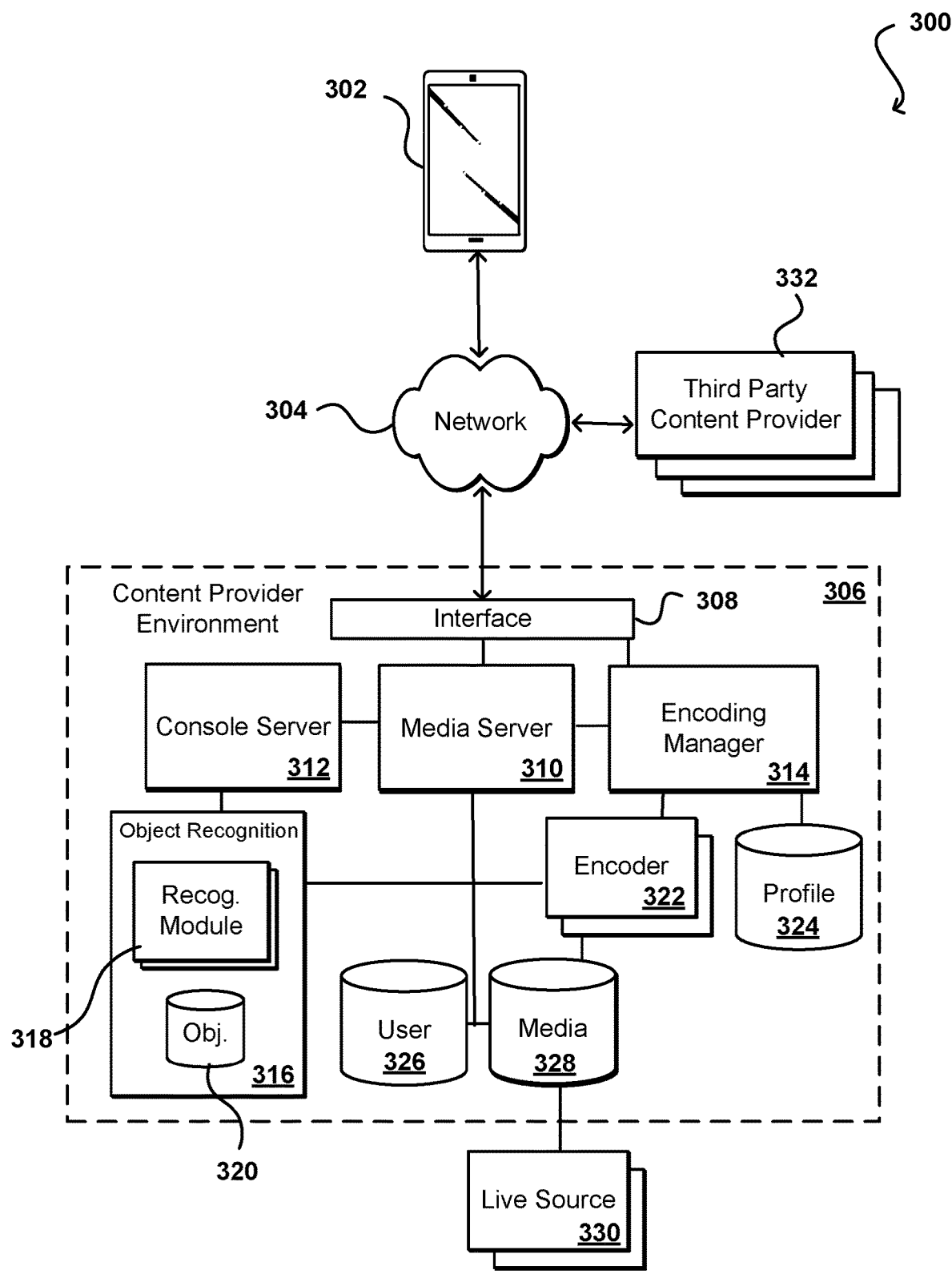
FIG. 3 illustrates an example media management service that can be utilized in accordance with various embodiments.

FIG. 3 illustrates an example content delivery system 300 that can be used to implement aspects of the various embodiments. In this example, a client computing device 302 can submit a request for content across at least one network 304 to be received by a content provider environment 306. This can include a request for specific content or a subscription to have content pushed to the client device 302, among other such options. In at least some embodiments the request can include a request for content to be displayed on, or presented via, the computing device 302, and in many cases will include audio, video, or other media content that is encoded for presentation by the client device 302. The network(s) can include any appropriate network, such as the Internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud"). As mentioned elsewhere herein, the client computing device 302 can be any appropriate computing or processing device, as may include a desktop or notebook computer, smartphone, tablet, wearable computer (i.e., smart watch, glasses, or contacts), set top box, or other such system or device. An interface layer 308, when receiving a request or call, can determine the type of call or request and cause information to be forwarded to the appropriate component or sub-system. For example, a request for content might be forwarded to a media server 310 while a request to specify encoding parameters or generate an encoding profile might be forwarded to a encoding manager 314 or console server 312, among other such options. These calls or requests can also come from third parties, such as streaming content providers who utilize the resources of the content provider environment 306, and third party providers 332 can provide at least some of the media content to be stored to a media repository 328 and/or encoded for display on the client device 302 as discussed herein. Further, a different type of client device 302 can be used to providing encoding information than is used to consume encoded content.

In this example, a call or request received to the content provider environment 306 can be received by an interface layer 308 of the environment. As known for network environments, the interface layer can include components such as interfaces (e.g., APIs), load balancers, request and/or data routers, and the like. If the request is a request for content, such as for a video data stream to be provided to the client device 302, information for the request can be directed to one or more media servers 310, which can obtain the content from a media data store 328 or other such repository or live media source 330 (or data cache temporarily storing media from the live media source) to be sent back across the network(s) 304 to the client device 302, which can be the device submitting the request or a device identified by the request, among other such options. In some embodiments, information for the request might also be compared against user data in a user data store 326 or other such location to determine, for example, whether the user has access rights to that content, and potentially the formats or versions to which the user has access rights.

In at least some embodiments a request from an operator, an administrator, a client device 302, a third party provider 332, or another such source might include a request to specify one or more sets of encoding parameters to be used with a media file. Accordingly, information regarding the encoding parameters can be provided to an encoding manager 314, or other such component or service, that is able to receive the information through an appropriate interface (i.e., an API or console) and cause the profile and parameter data to be stored to at least one appropriate repository 324 as discussed elsewhere herein. When a request for a video file is received, the encoding manager 314 can use the profile and parameter data to determine the appropriate encoding information, and can pass that to one or more encoders 322, such as may include encoding applications running on one or more allocated servers (physical or virtual), which can obtain the media file and encode the media file per the encoding information, which can then be provided to the client device by a media server 310 or other such component.

As mentioned, there are situations where the content to be transmitted to the client device 302 corresponds to a "live" stream. As referred to herein, a live stream refers to a transmission of media content that is received by the content provider environment during a period of capture, such that each frame of media content is received shortly after it is captured, for near real-time representation of an occurrence or event. This media data can be processed (i.e., encoded using appropriate encoding parameters) and then transmitted to the client device with minimal latency, such that the media data can be presented on the client device in near real time (i.e., less than a couple of seconds after the media data was initially captured). Approaches for capturing or displaying live broadcasts and streaming media are well known in the art and as such will not be discussed herein in detail.

For streaming media and other such content transmissions, various video encoding profiles or "presets" can be used that provide for granular control over the encoding parameters for the content to be transmitted. This level of control can require a complex, hierarchical, nested schema, along with an appropriate application programming interface (API) or other such interface, that are compatible with the encoding system. Any incompatibilities can result in a failed or incorrect encoding, which can prevent the media content from accurately being presented by the client device 302. In some conventional encoding systems an encoder appliance can be responsible for presenting, validating, and managing these encoding profiles. Such an architecture can present several challenges, however, such as how to manage these encoding profiles over the life of an encoder appliance that can have frequent changes to the core video encoding engine. For example, an encoding profile created for encoder version 1.0.0 might have a setting called "foo," which might be renamed or replaced for version 2.0.0 with a setting "bar." The version 2.0.0 encoder in this example would then have to maintain an upgrade path for any encoding profile that was created with version 1.0.0. For large numbers of versions and encoding profiles, this can quickly become difficult to manage and can have a high likelihood of error.

Accordingly, approaches in accordance with various embodiments provide a scalable architecture that is able to support current and future version of a media encoding engine. Such architecture can remove the complexity in conventional approaches which rely on the encoder to present and manage multiple encoding profiles. The architecture can provide a profile editor that is independent of any media encoder version, and that provides a normalized interface so that the end user (e.g., customers of the media service or content provider) can create and manage encoding profiles for any released version of the media encoder. In some embodiments, a profile editor can comprise a front-end application that is maintained outside the release cadence of the media editor. This can be a standalone application that customers install or a website accessed through a browser application, among other such options. The core logic for the profile editor can involve consuming a versioned schema, such as a JSON schema, that defines the available encoding settings to be presented to the user. A customer can use the editor to select, define, and/or modify the encoding settings for a profile. Once set, the profile editor can generate an output object, such as a data structure that can be in the form of a JSON object. The output is validated, and if valid can be versioned and written to persistent storage. This versioned output object will be used with the media encoder, in at least some embodiments, to encode corresponding live streaming events or other such content.

As mentioned, a customer can generate multiple profiles and there can be several customers associated with a media service. When combined with the number of encoder versions supported, the number of profiles and settings to manage can be quite large, particularly for enterprise-grade encoders. In conventional approaches, engineers often have to analyze and adjust the various encoding settings for each relevant profile. Encoder updates can be released relatively frequently in order to support new features, provide new settings, support new validations, and provide other such functionality. This can include, for example, supporting a new codec and the associated settings. By providing an architecture that supports such expansion without the need for users to update their software continually, the user experience is improved in addition to the reduction in resources otherwise needed to provide the additional or alternative functionality. Such an approach enables customer to fine tune settings without a need to upgrade, and customers can generate new profiles that are supported by the existing architecture. The architecture can ensure that any impact of the new settings is handled automatically and dynamically with minimal effort on the part of the customer or the provider.

As mentioned, it may be desired in at least some embodiments to perform object, occurrence, or content determinations for one or more media files or streams received to the content provider environment 312, whether generated internally, received from a third party provider 332, or received from a live source 330, among other such options. A component such as the console server 312 can work with the encoding manager 314 to cause the video feed to be analyzed while being processed by one or more encoders 332 to provide data for representative frames to an object recognition service 316 or sub-system. The object recognition service 316 can analyze the data using one or more recognition modules 318, as may include object detection algorithms or trained neural networks, among other such options, and can compare the data in some embodiments against representations of object stored to an object data store 320. As mentioned, confidence scores can be generated for each determination in some embodiments, and a sequence of frames can be analyzed in some embodiments to improve the confidence scores. The resulting object data, such as tags and timestamps, can then be written back to the encoder 322 for encoding in the file, or stored to the media data store 328 with the corresponding encoded media files, among other such options.

When determining an encoding profile for a media file, the possible values can be determined that are valid for the various primitives. As mentioned, this can include using a JSON schema, Swagger file, XML document, or other such approach to reflect the values. As an example, a customer can select a codec within the video settings. There may be dozens of codecs from which the user can select, and there may be some codecs that are not appropriate for this video stream or channel. The encoding settings module can be used to determine which codecs to provide as options to the customer through the console, as generated using the console server 312. The console service in this embodiment can be programmed to interact with various service endpoints across the content provider environment 306. The console server also is able to locate and serve up the static codebase, which can be pulled from a content delivery network (CDN) or other such location. The console server can obtain the schema modeling documents for generating the encoding profiles, and can generate the necessary information so that the relevant encoder can consume the corresponding profile. Once the customer selects a codec, such as the H.264 codec for high definition digital video, there will be various constraints on the remaining video encoding settings that correspond to the selected codec. An encoding settings module can consume the versioned schema in order to programmatically determine the relevant settings to then surface through the console. The module can also determine appropriate validation instructions for the attributes of the relevant fields. This can include, for example, validating a type of value presented for a field, such as whether the value is a number, string, or Boolean value, among other such options.

Figure 4:
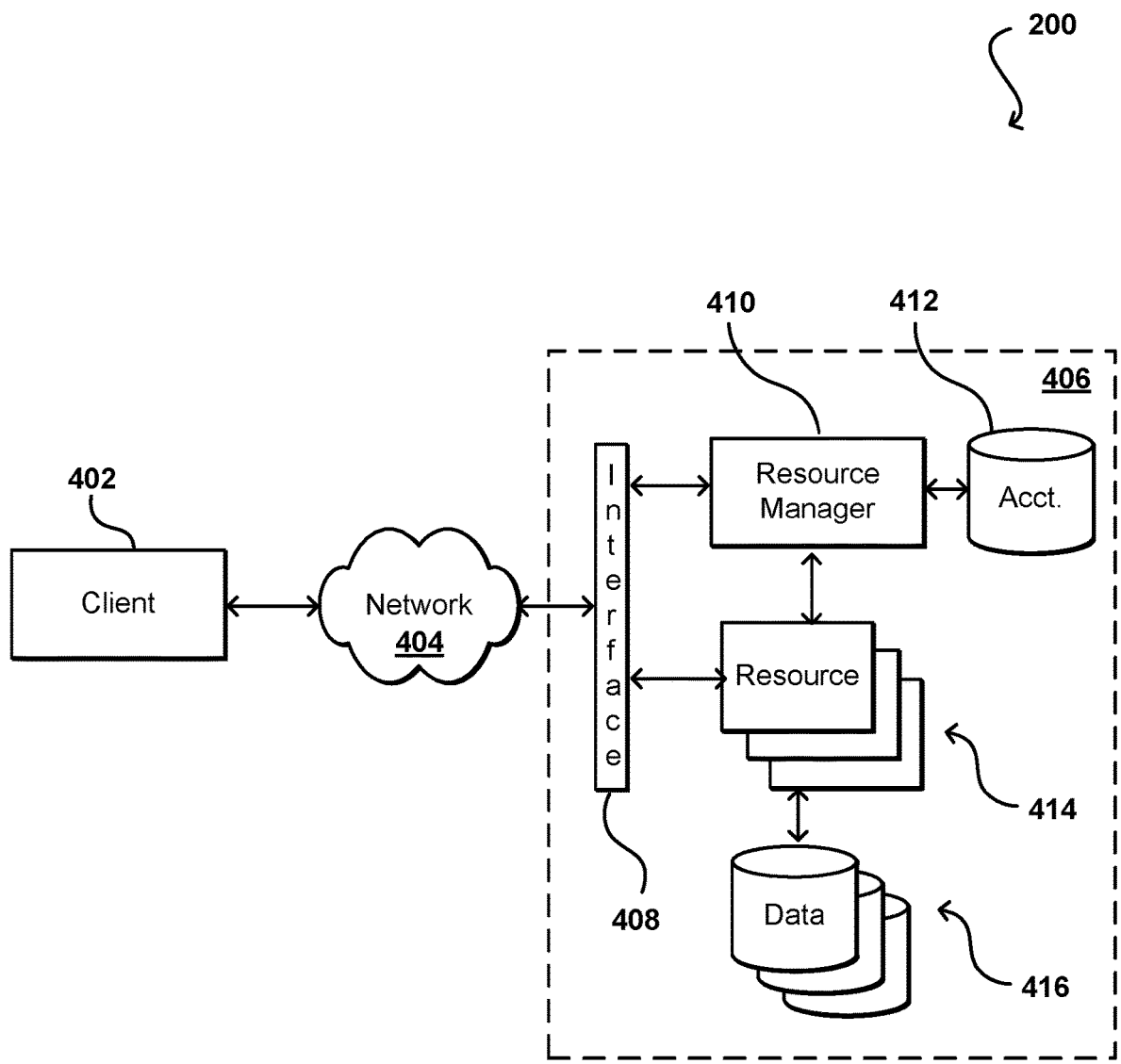
FIG. 4 illustrates an example system that can be used to provide resources for managing media content in accordance with various embodiments.

FIG. 4 illustrates an example environment 400 in which aspects of the various embodiments can be implemented. Such an environment can be used to allocate resources, or resource capacity, for purposes such as to encode or provide media content, among other such options. In this example a user is able to utilize a client device 402 to submit requests across at least one network 404 to a resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
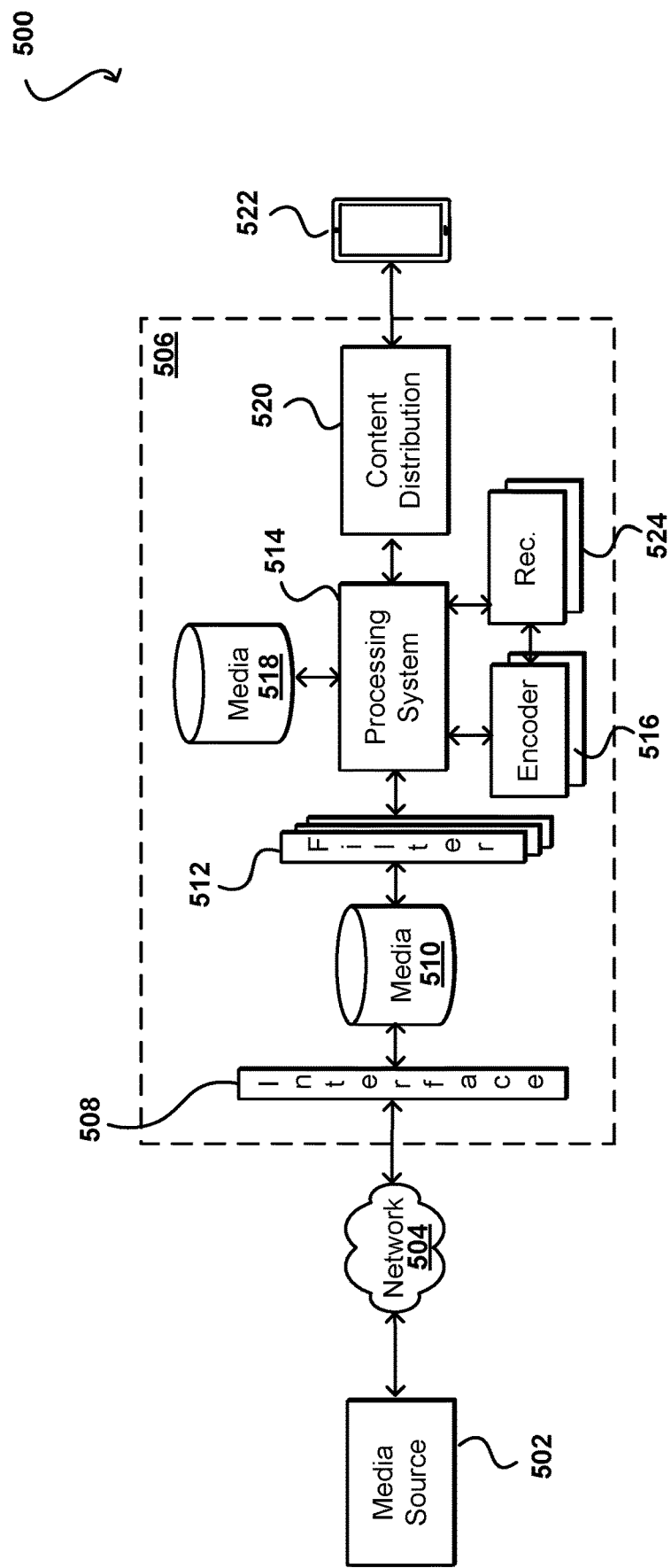
FIG. 5 illustrates an example media encoding system that can be utilized in accordance with various embodiments.

FIG. 5 illustrates an example system 500 that can be used to implement aspects of the various embodiments. In this example, one or more media sources 502 can upload media content over one or more networks 504 to be received to an interface layer 508 of a content provider environment 506. The content provider can be a shared resource environment, as discussed with respect to FIG. 4, or a dedicated network used by the content provider as part of a content service offering, among other such options. For live streaming options the media repository 510 may act as a cache or buffer, while for other options the repository might store the data until sufficient data has been received or an aggregation process in executed, etc.

In this example a processing system 514 can be tasked with analyzing, aggregating, or otherwise generating media content that can be output for display or other presentation on one or more client devices 522. The processing system can include various processing components such as host machines, virtual machines, and the like. The processing system 514, which can also be offered as a service from inside or external to the content provider environment, can obtain the media content from the media repository 510 and cause one or more filters 512 to be applied to the content. As mentioned, the filters can attempt to remove any content that does not satisfy specific criteria, rules, or policies. For example, filters might remove from consideration any files that are not of a specified format, resolution, minimum or maximum length, size range, orientation, or time period. Other filters might be used as well that might not remove the clips from consideration but might be used to rank those clips for potential selection, such as may include sharpness, blurriness, brightness, contrast, view, capture location, or amount of movement for video content, as well as volume, background noise, and dynamic range for audio content. Various other filters can be applied as well as discussed and suggested elsewhere herein. Further, at least some of these filters can be applied on the media sources 502 before upload. These filters can analyze the captured media content and analyze the content before uploading, or can potentially apply the filters before the capture of the content. For example, if a certain format or orientation is required and an attempt is made to capture and upload content with a different format or orientation, then an application on the device might notify the user before capture that the content does not satisfy the relevant criteria, such that the user can make any appropriate adjustments. In some instances the content adjustments might be made automatically, such as to capture in an appropriate format or resize to a specified size, while other adjustment might need to be made manually, such as to capture with a certain device orientation or adjust the amount of ambient lighting, etc.

The processing system 514 can receive or obtain the video content after the filtering and analyze the media content to determine which audio, video, text, or other content to include in the file or stream. The processing system can cause the content to be converted to at least one appropriate media file, for example, using various encoders 516, transcoders, processing algorithms, or other such components, systems, or services. In at least some embodiments, metadata can be written to the output file using the appropriate settings as discussed herein. The produced media can be written to the same media repository 510 or a different media repository 518, which can store the content for subsequent access or buffer the content for live streaming, among other such options. As mentioned, the encoders 516 can be configured to select representative frames for object recognition, and can provide the corresponding data to one or more recognition modules 524 that can analyze the data as discussed herein. The recognition modules can analyze the data, generate the corresponding object tags as metadata as discussed herein, then write the tags along with the other metadata for the file to a media repository 518, such that the metadata can be provided with the encoded data to a requesting device or destination.

When the content is to be provided for presentation via a client device 522 or other such system, a content distribution system 520, service, or network can obtain the appropriate data from the repository 518 and cause that content to be provided to the client device 522. In some embodiments, the client device 522 can have the ability to change the feed, stream, or file being received, such as by sending a request to the content distribution system 520 for a new stream, feed, or file. There may also be different versions of the stream, such as may have different sizes, qualities, or formats, from which a viewer can choose. The client device can also potentially upload content related to the media through the interface layer 508 for potential inclusion in subsequent portions, streams, feeds, or files for the content.

Figure 6:
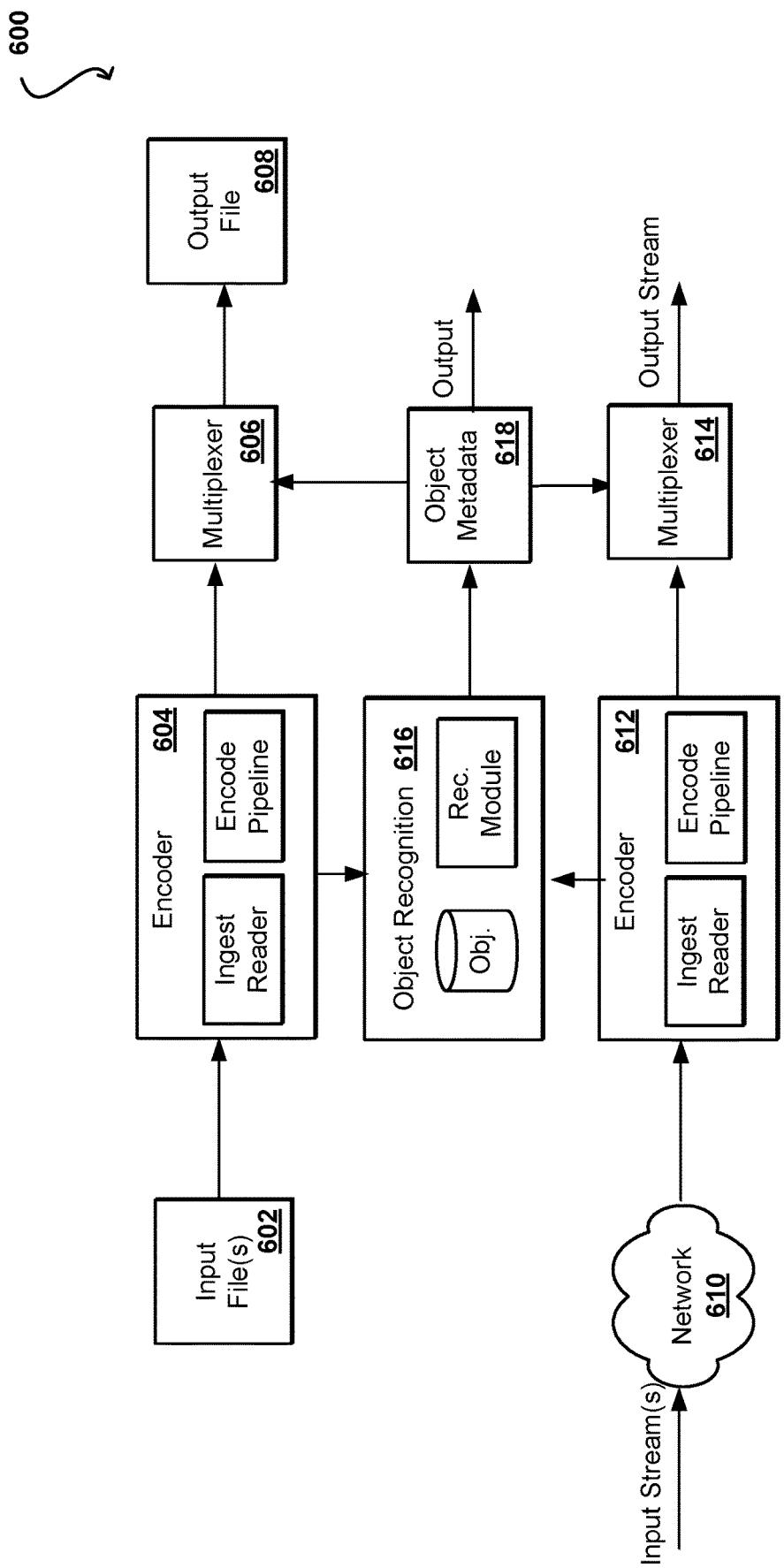
FIG. 6 illustrates components of an example media encoding system that can be utilized in accordance with various embodiments.

In some embodiments the encoding subsystem includes one or more encoders, a set of bitstreams (or video signals), and a content delivery network. Various encoders 604, 612 are illustrated in the example configuration 600 of FIG. 6. The one or more encoders can include both encoders and packagers, which can be implemented via an origin server. A packager can receive a signal (e.g., feed), such as a video signal, a media input file 602, or a live stream over at least one network 610. In this example there is an encoder 604 for the input media files and an encoder 612 for the input streams, with each having a respective multiplexer 606, 614, or sharing a multiplexer, for generating the output file 608 or stream. A live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to a content delivery network (CDN). The bitstreams can represent various encoded/packaged versions of the signal feed, as may be encoded per the encoding parameters from the encoding manager. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

As mentioned, the encoders 604, 612 can also analyze the input streams or files to determine representative frames, segments, or other portions that can be used for object analysis. The encoders can provide this information to an object recognition service 616, which can utilize stored object data, object recognition algorithms, trained neural networks, and other such components to analyze the representative frames and detect or identify objects represented in the data. As mentioned, the object data can be output from the object recognition service 616 as object metadata 618, which can be stored to an output data file that is associated with the output media file. In some embodiments, the metadata can be passed to a multiplexer or back to an encoder for being incorporated into the media file or stream itself. Various other approaches for providing the metadata with the media content can be used as well as discussed and suggested herein.

Each of the bitstreams generated in such an embodiment can comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/ updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time).

Various media encoders or transcoders can monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs) or high-definition multimedia inputs (HDMIs), can be monitored using such processes as well. As mentioned, the media content obtained by such a system can be provided from any of a number of different sources. For example, content might be obtained from a production company or third party provider.

Figure 7:
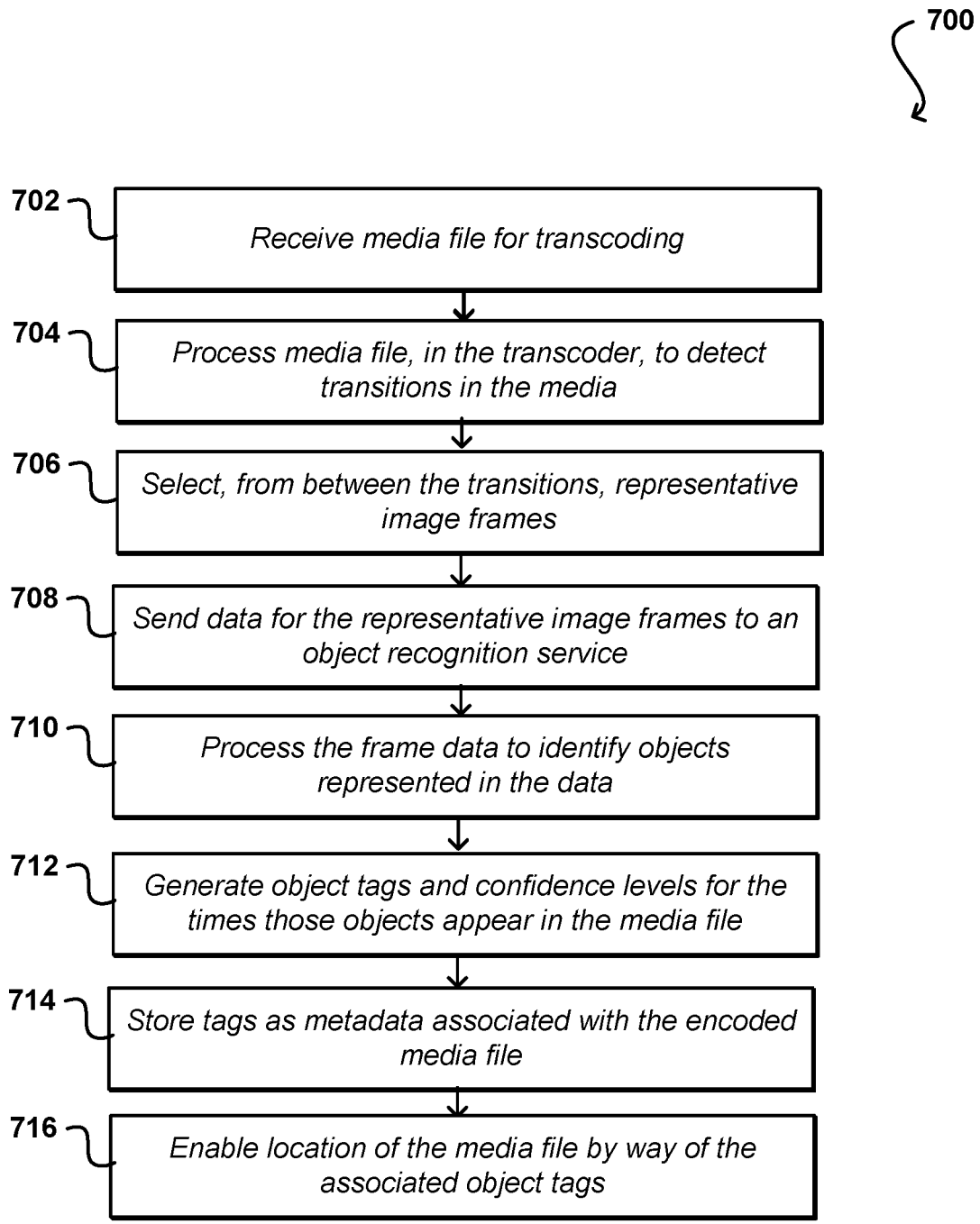
FIG. 7 illustrates an example process for identifying objects in a media file that can be utilized in accordance with various embodiments.

FIG. 7 illustrates an example process 700 for recognizing objects represented in a media file that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a media file is received 702 for transcoding. As mentioned, in many instances this will be a high resolution, high bit rate media file that is to be transcoded into one or more lower-quality formats for distribution to various types of client devices. In this example the media file is processed 704 in a transcoder pipeline to detect transitions in the media. As mentioned, this can include analysis of the audio, video, captioning, and/or metadata to detect transitions such as scene changes, fades, shot changes, rapid camera sweeps, and the like. One or more representative image frames can be selected 706 from between the transitions, such as near the start of a scene or shot in a playback sequence of the media file. Data for the representative file, such as image data for the video frame, can be sent 708 to an object recognition service, module, algorithm, or subsystem for analysis, which may be part of, or separate from, the transcoding pipeline. The frame data can be processed 710 to identify one or more objects represented in the frame data. As mentioned, the recognition can be performed using feature matching or a trained neural network, among other such options. One or more object tags, as well as confidence levels and other information discussed herein, can be generated 712 for each recognized object and corresponding to the location or time in the file where the object was detected. As mentioned, an object tag can include or be associated with an object identifier or classification, a time stamp, and a confidence value, among other such options. Occurrences or aspects of the media file may also have tags generated as well as discussed herein. The tags, once generated, can be stored 714 as metadata associated with the encoded media file, stored in the file itself or in a separate file or location. The tags can then be used for various purposes with respect to the media file. As mentioned, advertisers or content providers can use the tags to determine types of content to present to a viewer of the content. The tags can also enable 716 a location of that media file by way of the associated object tags, such as by searching for files that include a particular actor, location, or type of object, among other such aspects discussed and suggested herein.

Figure 8:
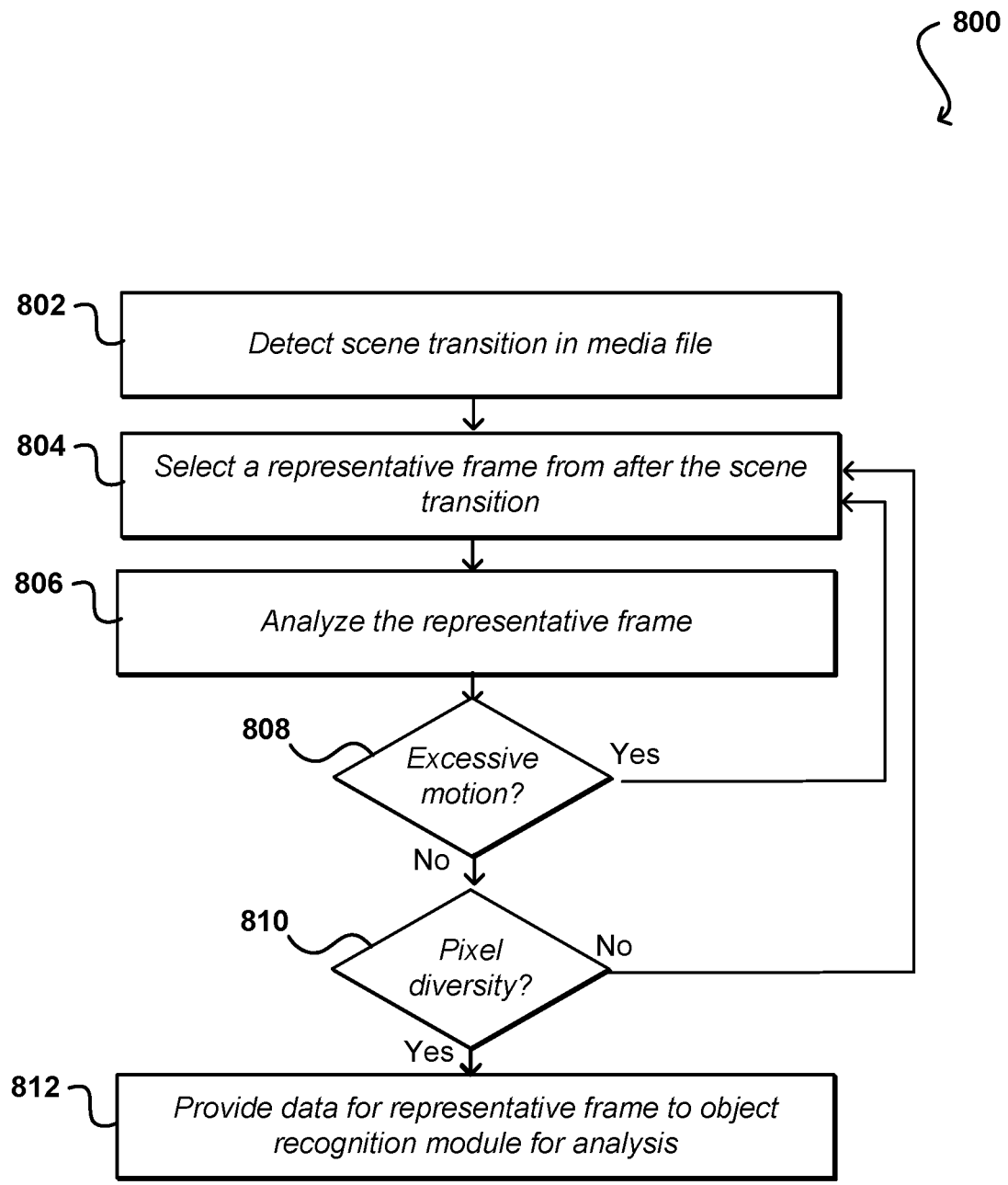
FIG. 8 illustrates an example process for selecting frames for object analysis that can be utilized in accordance with various embodiments.
Figure 9:
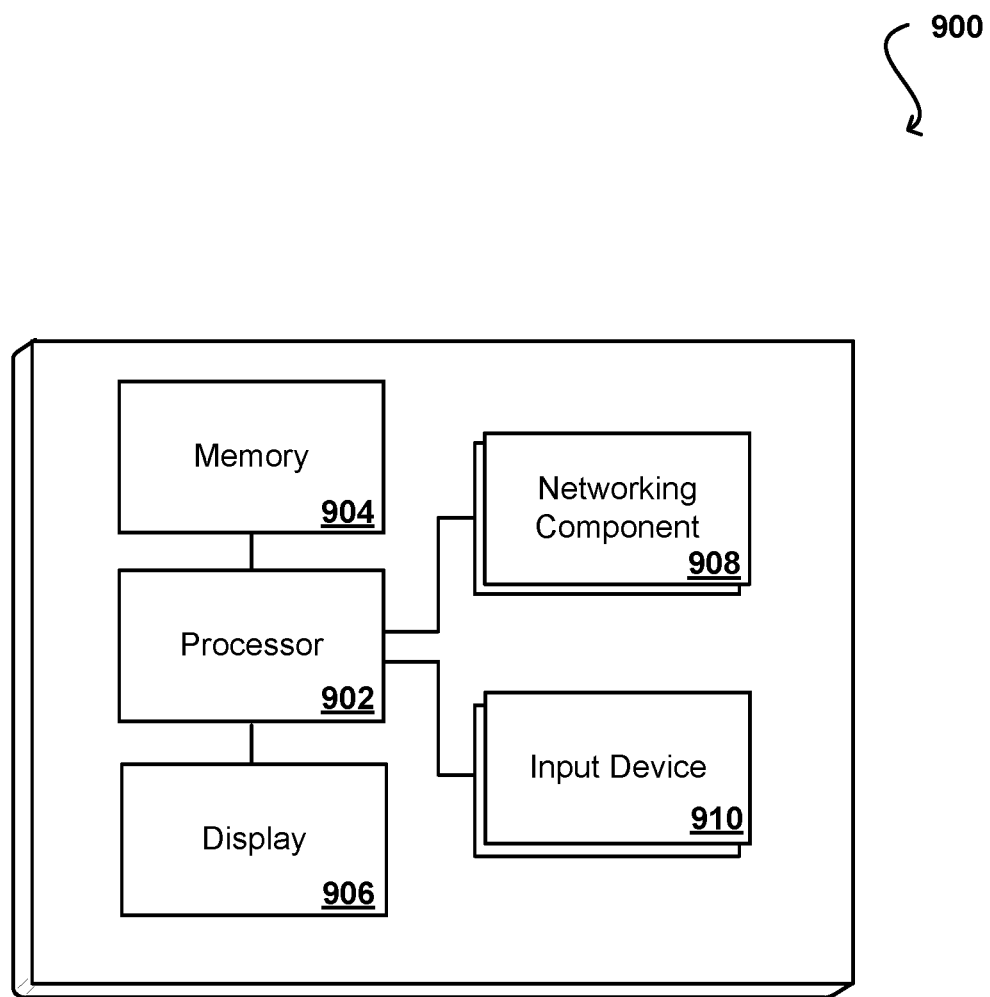
FIG. 9 illustrates example components of a computing device that can be used to implement aspects of various embodiments.

FIG. 8 illustrates an example process 800 for selecting representative frames for analysis that can be utilized in accordance with various embodiments. In this example, a scene transition is detected 802 in a media file. Various other transitions can be detected as well as discussed herein, as may be determined based upon audio, video, metadata, or other data contained within the media file. A representative frame can be selected 804 from the media file for a location after, but proximate, the scene transition. As discussed, this can be a likely place to discover new objects represented in a new shot or scene in the file. The representative frame can be analyzed 806 using various criteria to determine whether the frame is appropriate for object recognition. In this example, the motion represented in the image frame can be analyzed to determine 808 whether there is excessive motion in the frame. As mentioned, this can involve looking at motion vectors for the frame, or a series of frames, to determine whether a type or amount of motion exceeds an allowable motion threshold. As mentioned, a camera pan or explosion can cause excessive motion blur that would make object recognition difficult, while a still image frame or frame with little motion may yield accurate object recognition results. If the frame does not contain excessive motion effects, the frame can also be analyzed (separately or in the same step) to determine 810 whether the frame has sufficient or acceptable pixel density. This can include, for example, ensuring that the frame is not a frame of a solid color, such as a black frame, or of a single pattern with few to no distinguishable objects represented therein. Such an approach can also help to filter out blank frames that only contain noise or no encoded content. If the representative frame is determined to not at least meet these criteria then another representative frame can be selected from after the determined scene transition. Once an acceptable frame is located, data for the representative frame can be provided 812 to an object recognition module or other such destination for object recognition analysis.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    detecting a transition in a video input media during a transcoding of the video input media;
    selecting a plurality of representative frames of image data from the video input media subsequent the transition;
    determining, during the transcoding, that one or more of the representative frames satisfies at least one frame selection criterion; and
    sending the image data for the representative frames to an object recognition system configured to identify one or more objects represented in the representative frame and determine a confidence level for individual identified objects of the one or more objects indicating likelihood that the respective object appears in a given representative frame of the representative frames.

2. The computer-implemented method of claim 1, further comprising:
    identifying the one or more objects represented in the image data; and
    storing object data associated with the video input media, the object data identifying the one or more objects.

3. The computer-implemented method of claim 2, further comprising:
    generating object tags for the one or more objects, the object tags including at least one of an object identifier, a confidence score, or location information with respect to the video input media.

4. The computer-implemented method of claim 3, further comprising:
    receiving a request pertaining to a type of object; and
    identifying the video input media based at least in part upon an associated object tag, of the object tags, corresponding to the type of object.

5. The computer-implemented method of claim 1, further comprising:
    analyzing at least one section of the representative frame with respect to at least one proximate image frame in the video input media;
    generating one or more motion vectors indicative of a change in position of one or more objects represented in the representative image frame and the at least one proximate image frame; and
    analyzing the at least one motion vector to determine that a motion, represented by the one or more motion vectors, satisfies a motion criterion of the at least one frame selection criterion, the motion criterion relating to at least one of an amount, direction, or type of motion represented by the one or more motion vectors.

6. The computer-implemented method of claim 1, further comprising:
    analyzing pixel values for at least one section of the representative image frame to determine whether the pixel values satisfy at least one of a diversity criterion, a compression criterion, or a color criterion of the at least one frame selection criterion.

7. The computer-implemented method of claim 1, further comprising:
    receiving a request to receive the video input media for presentation;
    providing the object tags with the video input media; and
    causing supplemental content to be selected for playback with the video input media based at least in part upon the object tags.

8. The computer-implemented method of claim 1, further comprising:
    detecting a set of transitions represented in the video input media; and
    selecting at least one representative frame between adjacent pairs of the transitions in the video input media.

9. The computer-implemented method of claim 1, wherein an object identified by the object recognition system includes at least one of a person, an animal, an inanimate object, a location, a product, a genre, an emotion, a sentiment, an action, an expression, or an occurrence.

10. The computer-implemented method of claim 1, further comprising:
    detecting the transition by analyzing at least one of audio data, video data, image data, captioning data, or metadata contained within the video input media.

11. A system, comprising:
    at least one processor; and
    memory including instructions that, when executed by the system, cause the system to:
    detect a transition in a video input media during a transcoding of the video input media;
    select a plurality of representative frames of image data from the video input media subsequent the transition;
    determine, during the transcoding, that one or more of the representative frames satisfies-at least one frame selection criterion; and
    provide the image data for the representative frames to an object recognition system configured to identify one or more objects represented in the representative frames and determine a confidence level for individual identified objects of the one or more objects indicating likelihood that the respective object appears in a given representative frame of the representative frames.

12. The system of claim 11, wherein the instructions when executed further cause the system to:

identify the one or more objects represented in the image data; and store object data associated with the video input media, the object data identifying the one or more objects.

13. The system of claim 11, wherein the instructions when executed further cause the system to:

generate object tags for the one or more objects, the object tags including at least one of an object identifier, a confidence score, or location information with respect to the video input media;

receive a request pertaining to a type of object; and identify the video input media based at least in part upon an associated object tag, of the object tags, corresponding to the type of object.

14. The system of claim 11, wherein the instructions when executed further cause the system to:

analyze at least one section of the representative frame with respect to at least one proximate image frame in the video input media;

generate one or more motion vectors indicative of a change in position of one or more objects represented in the representative image frame and the at least one proximate image frame; and analyze the at least one motion vector to determine that the type of motion, represented by the one or more motion vectors, satisfies a motion criterion of the at least one frame selection criterion, the motion criterion relating to at least one of an amount, direction, or type of motion represented by the one or more motion vectors.

15. The system of claim 11, wherein the instructions when executed further cause the system to:

analyze pixel values for at least one section of the representative image frame to determine whether the pixel values satisfy at least one of a diversity criterion, a compression criterion, or a color criterion of the at least one frame selection criterion.

16. A non-transient computer readable medium storing one or more sequences of instructions executable by one or more processors to perform a set of operations comprising:

detecting a transition in video input media during a transcoding of the video input media;

selecting a plurality of representative frames of image data from the video input media subsequent the transition;

determining, during the transcoding, that one or more of the representative frames satisfies at least one frame selection criterion; and providing the image data for the representative frames to an object recognition system configured to identify one or more objects represented in the representative frames and determine a confidence level for individual identified objects of the one or more objects indicating likelihood that the respective object appears in a given representative frame of the representative frames.

17. The system of claim 16, wherein the instructions further comprise:

identifying the one or more objects represented in the image data; and storing object data associated with the video input media, the object data identifying the one or more objects.

18. The system of claim 16, wherein the instructions further comprise:

generating object tags for the one or more objects, the object tags including at least one of an object identifier, a confidence score, or location information with respect to the video input media;

receiving a request pertaining to a type of object; and identifying the video input media based at least in part upon an associated object tag, of the object tags, corresponding to the type of object.

19. The system of claim 16, wherein the instructions further comprise:

analyzing at least one section of the representative frames with respect to at least one proximate image frame in the video input media;

generating one or more motion vectors indicative of a change in position of one or more objects represented in the representative image frames and the at least one proximate image frame; and analyzing the at least one motion vector to determine that the type of motion, represented by the one or more motion vectors, satisfies a motion criterion of the at least one frame selection criterion, the motion criterion relating to at least one of an amount, direction, or type of motion represented by the one or more motion vectors.

20. The system of claim 16, wherein the instructions further comprise:

analyzing pixel values for at least one section of the representative image frames to determine whether the pixel values satisfy at least one of a diversity criterion, a compression criterion, or a color criterion of the at least one frame selection criterion.

* * * * *